United States Patent [19]

Feldman et al.

[11] 4,229,569

[45] Oct. 21, 1980

[54] PROCESS FOR THE REMOVAL OF VINYL CHLORIDE FROM AQUEOUS SLURRIES OF VINYL CHLORIDE POLYMERS

[75] Inventors: Martin L. Feldman, East Brunswick; Donald Goodman, Flemington; Marvin Koral, Warren; Robert S. Miller, Bridgewater; Robert J. Stanaback, Gladstone, all of N.J.

[73] Assignee: Tenneco Chemicals, Inc., Saddle Brook, N.J.

[21] Appl. No.: 9,328

[22] Filed: Feb. 5, 1979

Related U.S. Application Data

[63] Continuation-in-part of Ser. No. 482,112, Jun. 24, 1974, abandoned.

[51] Int. Cl.$^3$ .......................... C08F 6/24; C08F 14/06
[52] U.S. Cl. ................................ 528/501; 526/344.3; 528/499; 528/503
[58] Field of Search ....................... 528/499, 503, 501

[56] References Cited

U.S. PATENT DOCUMENTS

| | | | |
|---|---|---|---|
| 2,647,103 | 7/1953 | Griffith | 528/503 X |
| 2,662,867 | 12/1953 | Hoertz | 528/500 X |
| 2,674,585 | 4/1954 | Condo | 528/503 X |
| 3,052,663 | 9/1962 | Bodlaender | 528/499 X |

FOREIGN PATENT DOCUMENTS 2331895  1/1974 Fed. Rep. of Germany ........... 528/500

*Primary Examiner*—C. A. Henderson
*Attorney, Agent, or Firm*—Evelyn Berlow

[57] ABSTRACT

Vinyl chloride is removed from aqueous slurries prepared by the suspension polymerization of a monomer component that comprises vinyl chloride by heating the slurries at a temperature between 70° C. and the boiling point of water at a pressure in the range of 30 mm Hg absolute to 3 atmospheres and removing the evolved vinyl chloride until the aqueous slurry contains less than 50 ppm and preferably less than 0.1 ppm of vinyl chloride, based on the weight of polymer in the slurry. The polymers that are recovered from the purified aqueous slurries contain less than 10 ppm, and in most cases less than 0.1 ppm of vinyl chloride.

4 Claims, No Drawings

PROCESS FOR THE REMOVAL OF VINYL CHLORIDE FROM AQUEOUS SLURRIES OF VINYL CHLORIDE POLYMERS

CROSS-REFERENCE TO RELATED APPLICATION

This is a continuation-in-part of our copending application Ser. No. 428,112, which was filed on June 24, 1974, now abandoned.

This invention relates to a process for the purification of aqueous slurries of vinyl chloride polymers. More particularly, it relates to a rapid and economical process for the removal of vinyl chloride from aqueous slurries prepared by the suspension polymerization of a monomer component comprising vinyl chloride that contain 5% to 50% by weight of a vinyl chloride polymer as particles that range in size from 25 microns to 500 microns, from 1000 parts to 15,000 parts by weight of vinyl chloride per million parts by weight of the slurry, and not more than 0.1% by weight of a surfactant. In addition, it relates to the recovery of vinyl chloride polymers that contain less than 10 ppm of vinyl chloride from the purified aqueous slurries.

BACKGROUND OF THE INVENTION

Vinyl chloride homopolymers and copolymers are produced commercially by suspension, emulsion, solution, and bulk techniques, which yield products that differ widely in such properties as particle size and shape, porosity, total surface area, molecular weight, and purity. The end-use applications in which the polymers can be used are determined to a large extent by the procedure by which they wee prepared.

Suspension polymerization is the most widely used of the polymerization procedures for vinyl chloride because it yields products that have combinations of properties that make them adaptable to the dry blending, preblending, and thermoplastic processing techniques that are used in the fabrication of vinyl chloride polymer products. In addition, suspension polymerization processes have economic and control advantages over the other types of polymerization processes.

In the suspension polymerization processes, a monomer component that comprises vinyl chloride is dispersed in an aqueous medium using vigorous agitation. Polymerization is started in the monomer droplets by means of a monomer-soluble initiator. A surfactant is used to minimize coalescence of the growing polymer particles by forming a protective layer around them. The polymerization is carried out at a temperature and a pressure that will yield a polymer having the desired molecular weight. The product of the polymerization is an aqueous slurry that contains 5% to 50% by weight, usually 20% to 40% by weight, of a vinyl chloride polymer in the form of particles that range in size from about 25 microns to about 500 microns, not more than 0.1% by weight of the surfactant, and up to 5% by weight of unreacted vinyl chloride. Most of the unreacted monomer is removed by heating the slurry under reduced presure to about 65° C. As it is ordinarily practiced, this stripping procedure reduces the monomer content of the slurry to about 1000 parts to 15,000 parts by weight of vinyl chloride per million parts by weight of polymer in the slurry. Further processing yields dry products that may contain 500 ppm or more monomer.

In view of the present safety standards that require that the amount of monomeric vinyl chloride in vinyl chloride polymers and in the atmosphere that workers breathe be maintained at very low levels, it is necessary that the monomer content of the slurry and of the polymer recovered from it be sufficiently reduced that these requirements can be met.

Procedures for removing vinyl chloride from latexes of vinyl chloride polymers that have been produced by the emulsion polymerization of vinyl chloride have been reported, for example, in U.S. Pat. Nos. 2,662,867 (Hoertz) and 3,052,663 (Bodlaender et al.). These procedures cannot ordinarily be applied to the removal of vinyl chloride from aqueous slurries produced by the suspension polymerization technique for a number of reasons; e.g., they do not reduce the monomer contents of the slurries to the required very low level; they may cause foaming or otherwise interfere with the processing of the slurry; and they usually have a deleterious effect on the physical properties of the products.

The greater difficulty in removing vinyl chloride from aqueous slurries of vinyl chloride polymers produced by suspension polymerization than from latexes produced by emulsion polymerization of vinyl chloride is believed to result from differences in the particle size, particle structure, and molecular weights of the polymers and in the amounts of surfactants that they contain.

In aqueous slurries prepared by suspension polymerization processes, relatively low molecular weight vinyl chloride polymers are present as moderately-porous granules or agglomerates that range from about 25 microns to 500 microns in diameter, whereas latexes prepared by emulsion polymerization processes contain relatively high molecular weight vinyl chloride polymers as discrete, spherical, non-porous particles that have diameters in the range of about 0.01 micron to 2 microns. The surfactant content of the slurries is from 0.02% to 0.1% by weight; that of the latexes is from about 1% to 5% by weight. Because of the smaller size of the polymer particles, a given weight of emulsion-type polymer has a far greater surface area than the same weight of suspension-type polymer. These differences between typical suspension-type and emulsion-type vinyl chloride polymers are shown in the table that follows:

|  | Vinyl Chloride Polymers | |
|---|---|---|
|  | Suspension-Type | Emulsion-Type |
| Particle Size (microns) | 25–500 | 0.01–2 |
| Particle Structure | Granules or agglomerates | Discrete spherical particles |
| Surface Area (m²/g) | 0.1–2.5 | 8–30 |
| Molecular Weight | Relatively Low | Relatively High |
| Porosity | Moderately porous | Non-porous |
| Surfactant Content of Slurry or Latex (%) | 0.02–0.1 | 1–5 |

The greater surface area of the emulsion-type polymers results in faster diffusion of monomer from the polymer particles. The presence of larger amounts of surfactant in the latexes than in the slurries results in the recovery from them of polymers that have a higher level of impurities, which may degrade the electrical and other properties of the polymers.

SUMMARY OF THE INVENTION

It has now been found that monomer can be removed from the previously-known aqueous slurries prepared by the suspension polymerization of a monomer component that comprises vinyl chloride to yield aqueous slurries containing less than 50 ppm of vinyl chloride from which vinyl chloride polymers that contain less than 10 ppm of vinyl chloride can be recovered.

The aqueous slurries from which vinyl chloride is removed to yield the purified aqueous slurries of this invention contain 5% to 50% by weight of vinyl chloride polymer particles ranging in size from about 25 microns to 500 microns, and preferably from 75 microns to 250 microns; not more than 0.1%, and preferably not more than 0.05% by weight of a surfactant; and 1000 parts to 15,000 parts by weight of vinyl chloride per million parts of polymer in the slurry. After treatment to remove monomer from them, the aqueous slurries contain 5% to 50% by weight of a vinyl chloride polymer, the polymer being present as particles ranging in size from about 25 microns to 500 microns; not more than 50 ppm of vinyl chloride; and not more than 0.1% by weight of surfactant. The aqueous slurries that have been purified in accordance with the process of this invention preferably contain 20% to 40% by weight of polymer particles ranging in size from 75 microns to 225 microns; less than 0.1 ppm of vinyl chloride; and 0.05% by weight or less surfactant. When these slurries are dewatered, the vinyl chloride polymer obtained has a particle size in the range of about 25 microns to 500 microns, preferably 75 microns to 250 microns, and it contains less than 10 ppm and in most cases less than 0.1 ppm of vinyl chloride.

DETAILED DESCRIPTION OF THE INVENTION

In accordance with this invention, it has been found that vinyl chloride can be removed rapidly and economically from aqueous slurries prepared by the suspension polymerization of a monomer component comprising vinyl chloride that contain 5% to 50% by weight of a vinyl chloride polymer as particles that range in diameter from 25 microns to 500 microns, from 1000 ppm to 15,000 ppm of vinyl chloride, and not more than 0.1% by weight of a surfactant by heating them at a temperature between 70° C. and the boiling point of water at a pressure in the range of 300 mm Hg absolute to 3 atmospheres and removing the vinyl chloride that is evolved until the slurry contains less than 50 ppm and preferably less than 0.1 ppm of vinyl chloride, based on the weight of polymer in the slurry.

The removal of vinyl chloride from aqueous slurries of vinyl chloride polymers by the process of this invention is ordinarily effected at a temperature between 70° C. and 125° C. at a pressure in the range of 300 mm Hg absolute to 3 atmospheres. It is preferably effected at a temperature between 80° C. and 100° C. at a pressure in the range of 400 mm Hg absolute to atmospheric pressure because under these conditions little or no discoloration or other degradation of the polymer occurs during monomer removal.

The processing of aqueous slurries of vinyl chloride polymers at elevated temperatures to reduce their monomer contents is contrary to the teachings of the art, according to which vinyl chloride polymers are degraded by such treatment.

The aqueous slurries of vinyl chloride polymers containing less than 50 ppm of vinyl chloride that are produced by the process of this invention can be dewatered to yield suspension-type vinyl chloride polymers that contain less than 10 ppm, and usually less than 0.1 ppm, of vinyl chloride.

The aqueous slurries from which residual monomer is removed by the process of this invention are prepared by the conventional suspension polymerization procedure. In this procedure, vinyl chloride or a mixture of vinyl chloride and at least one copolymerizable monomer is suspended in water by means of agitation. The polymerization is started by means of a free radical generating polymerization initiator, for example, dilauroyl peroxide, dibenzoyl peroxide, diisopropyl peroxydicarbonate, tert.-butyl peroxypivalate, azobisisobutyronitrile, azobis-2,4-dimethylvaleronitrile, combinations of dialkyl peroxydicarbonates and dilauroyl peroxide, sulfonyl peroxides, and the like. A surfactant is also present in the polymerization mixture. As used herein, the term "surfactant" includes suspension stabilizers, dispersing agents, protective colloids, and the like that are ordinarily used in suspension polymerization processes. Illustrative of these surfactants are methylcellulose, hydroxymethylcellulose, hydroxyethylcellulose, hydroxypropylcellulose, polyvinyl alcohol, gelatin, starch, methyl vinyl ethyl-maleic anhydride copolymers, vinyl acetatemaleic anhydride copolymers, metal salts of carboxymethylcellulose and polyacrylic acids, and mixtures thereof.

When copolymers are prepared, vinyl chloride is polymerized with a copolymerizable monomer to form a product that contains up to 35% by weight of the comonomer. Among the monomers that can be copolymerized with vinyl chloride are acrylic acid, acrylonitrile, n-butyl acrylate, diallyl maleate, dibutyl maleate, diethyl fumarate, dimethyl itaconate, ethyl acrylate, ethylene, isobutylene, maleic anhydride, methacrylic acid, methacrylonitrile, methyl acrylate, methyl vinyl ether, 2-ethylhexyl acrylate, propylene, triallyl cyanurate, triallyl isocyanurate, trimethylolpropane trimethacrylate, vinyl acetate, N-vinyl carbazole, vinylidene chloride, vinyl isobutyl ether, N-vinylpyrrolidone, and mixtures thereof.

Because of their very low monomer contents, aqueous slurries that have been purified by the process of this invention can be further processed without releasing substantial amounts of vinyl chloride into the atmosphere of working areas and thereby creating a health hazard. The polymers obtained by dewatering these slurries can safely be subjected to the milling, calendering, and extruding procedures that are used in fabricating useful articles from vinyl chloride resins.

The invention is further illustrated by the following examples. In these examples, all parts are parts by weight and all percentages are percentages by weight.

EXAMPLE 1

A. An aqueous slurry of polyvinyl chloride was prepared by suspension polymerization of vinyl chloride using 0.5% of a mixture of lauryl peroxide and di-2-ethylhexyl peroxydicarbonate as the initiator and 0.04% of methylcellulose as the suspending agent. The slurry contained 30% of polyvinyl chloride particles that ranged in size from 75 l microns to 250 microns, 4663 ppm of vinyl chloride, and less than 0.05% of methylcellulose.

B. The slurry was heated at 80° C. at a pressure of 400 mm Hg absolute. At the end of one hour, the slurry contained 20 ppm of monomer; at the end of two hours, it contained less than 0.1 ppm of monomer.

C. The treated slurry was filtered. Polyvinyl chloride particles that ranged in size from 75 microns to 250 microns were recovered and dried overnight at 50° C. The dried polymer particles contained less than 0.1 ppm of vinyl chloride.

D. For comparative purposes, the slurry whose preparation is described in paragraph 1A was heated at 45° C. at a pressure of 400 mm Hg absolute for 3 hours. After this treatment, it contained 385 ppm of vinyl chloride.

EXAMPLE 2

A. An aqueous slurry of a vinyl chloride-vinyl acetate copolymer was prepared by heating in an autoclave at 65° C. for 18 hours a polymerization system that contained 85 parts of vinyl chloride, 15 parts of vinyl acetate, 185 parts of deionized water, 0.125 part of dilauroyl peroxide, 0.175 part of gelatin, and 0.69 part of trichloroethylene. The slurry, which contained 35% of vinyl chloride-vinyl acetate copolymer particles that ranged in size from 50 to 200 microns and 0.06% of gelatin, was heated under vacuum at a temperature below 65° C. to reduce its vinyl chloride content to 1375 parts per million.

B. A portion of the copolymer slurry was agitated and heated at 75° C. at atmospheric pressure for 4 hours in a round bottom flask equipped with an air condenser, agitator, and thermometer. The treated slurry, which had a vinyl chloride content of 4 ppm, was filtered. After they had been dried overnight, the copolymer particles, which ranged in size from 50 to 200 microns, had a vinyl chloride content of less than 1 ppm.

C. A portion of the copolymer slurry whose preparation is described above was agitated and heated at 90° C. at a pressure of 600 mm Hg absolute. At the end of 30 minutes, the slurry had a vinyl chloride content of less than 0.1 ppm. The slurry was filtered. After they had dried overnight, the copolymer particles had a vinyl chloride content of less than 0.1 ppm.

EXAMPLE 3

A. An aqueous slurry of a vinyl chloride-vinyl acetate copolymer was prepared by heating in an autoclave at 85° C. for 18 hours a polymerization system that contained 70 parts of vinyl chloride, 30 parts of vinyl acetate, 230 parts of deionized water, 0.125 part of dilauroyl peroxide, 0.175 part of gelatin, and 0.65 part of trichloroethylene. The slurry, which contained 30% of vinyl chloride-vinyl acetate copolymer particles that ranged in size from 100 microns to 300 microns, contained 3000 ppm of vinyl chloride and 0.058% of gelatin.

B. The copolymer slurry was heated at 85° C. at atmospheric pressure. At the end of one hour, the slurry contained 15 ppm of vinyl chloride; at the end of two hours, it contained less than 0.1 ppm of vinyl chloride.

C. The slurry was filtered. The copolymer particles after overnight drying contained less than 0.1 ppm of vinyl chloride.

EXAMPLE 4

A. An aqueous slurry that contained 35% of polyvinyl chloride particles that ranged in size from 50 microns to 200 microns and 8565 ppm of vinyl chloride was prepared by the procedure described in Example 1A.

B. A portion of the slurry was heated at 100° C. at atmospheric pressure. After 30 minutes, the slurry contained less than 0.1 ppm of vinyl chloride.

C. For comparative purposes, a portion of the slurry was heated at 60° C. at atmospheric pressure. After 3 hours, the slurry contained 185 ppm of vinyl chloride.

EXAMPLE 5

A. An aqueous slurry that contained 25% of polyvinyl chloride particles that ranged in size from 75 microns to 200 microns and 2640 ppm of vinyl chloride was prepared by the procedure described in Example 1A.

B. A portion of the slurry was heated at 70° C. at a pressure of 350 mm Hg absolute. After 2 hours, the slurry contained less than 0.1 ppm of vinyl chloride.

C. For comparative purposes, a portion of the slurry was heated at 60° C. at a pressure of 350 mm Hg absolute. After 3 hours the slurry contained 95 ppm of vinyl chloride.

EXAMPLE 6

A. An aqueous slurry that contained 30% of vinyl chloride-vinyl acetate particles that ranged in diameter from 50 microns to 250 microns and 1575 ppm of vinyl chloride was prepared by the procedure described in Example 3A.

B. The slurry was heated at 85° C. at a pressure of 500 mm Hg absolute. At the end of 30 minutes, the slurry contained less than 0.1 ppm of monomer.

What is claimed is:

1. The process for removal of vinyl chloride from an aqueous slurry prepared by the suspension polymerization of a monomer component selected from the group consisting of vinyl chloride and mixtures of vinyl chloride with up to 35% by weight of at least one monomer copolymerizable therewith, said slurry containing from 5% to 50% by weight of vinyl chloride polymer particles ranging in size from about 25 microns to 500 microns, from 1000 parts to 15,000 parts by weight of vinyl chloride per million parts by weight of polymer in the slurry, and not more than 0.1% by weight of surfactant, that comprises the steps of heating said aqueous slurry at a temperature between 70° C. and the boiling point of water at a pressure in the range of 300 mm Hg absolute to 3 atmospheres and removing the vinyl chloride that is evolved until the slurry contains less than 0.1 ppm of vinyl chloride, based on the weight of polymer in the slurry.

2. The process of claim 1 wherein the aqueous slurry is heated at a temperature between 80° C. and 100° C. at a pressure in the range of 400 mm Hg absolute to atmospheric pressure while the vinyl chloride vapor that is evolved is removed until the slurry contains less than 0.1 ppm of vinyl chloride, based on the weight of polymer in the slurry.

3. The process for the production of vinyl chloride polymers that contain less than 0.1 ppm of vinyl chloride that comprises the steps of
   (a) heating an aqueous slurry prepared by the suspension polymerization of a monomer component selected from the group consisting of vinyl chloride and mixtures of vinyl chloride with up to 35% by weight of at least one monomer copolymerizable therewith, said slurry containing from 5% to 50% by weight of vinyl chloride polymer particles ranging in size from about 25 microns to 500 microns, from 1000 ppm to 15,000 ppm of vinyl chloride, and not more than 0.1% by weight of surfactant, at a temperature between 70° C. and the boiling point of water at a pressure in the range of 300 mm Hg absolute to 3 atmospheres and removing the vinyl chloride that is evolved until the slurry contains less than 0.1 ppm of vinyl chloride, based on the weight of polymer in the slurry, and (b) recovering from said aqueous slurry a vinyl chloride polymer that contains less than 0.1 ppm of vinyl chloride.

4. The process of claim 3 wherein in Step (a) the aqueous slurry is heated at a temperature between 80° C. and 100° C. at a pressure in the range of 400 mm Hg absolute to atmospheric pressure.

* * * * *